(12) United States Patent
Aoshima et al.

(10) Patent No.: US 11,052,634 B2
(45) Date of Patent: Jul. 6, 2021

(54) LAMINATED SUBSTRATE FOR ELECTROCHROMIC DIMMER ELEMENT AND MANUFACTURING METHOD FOR ELECTROCHROMIC DIMMER ELEMENT

(71) Applicants: AGC GLASS EUROPE SA, Louvain-la-Neuve (BE); AGC INC., Chiyoda-ku (JP); AGC FLAT GLASS NORTH AMERICA, INC., Alpharetta, GA (US); AGC VIDROS DO BRASIL LTDA., Guaratingueta (BR)

(72) Inventors: Yuki Aoshima, Chiyoda-ku (JP); Hidefumi Odaka, Chiyoda-ku (JP)

(73) Assignees: AGC GLASS EUROPE SA, Louvain-la-Neuve (BE); AGC INC., Chiyoda-ku (JP); AGC FLAT GLASS NORTH AMERICA, INC., Alpharetta, GA (US); AGC VIDROS DO BRASIL LTDA., Guaratingueta (BR)

( * ) Notice: Subject to any disclaimer, the term of this patent is extended or adjusted under 35 U.S.C. 154(b) by 25 days.

(21) Appl. No.: 16/081,198

(22) PCT Filed: Feb. 7, 2017

(86) PCT No.: PCT/JP2017/004429
§ 371 (c)(1),
(2) Date: Aug. 30, 2018

(87) PCT Pub. No.: WO2017/150100
PCT Pub. Date: Sep. 8, 2017

(65) Prior Publication Data
US 2019/0061314 A1 Feb. 28, 2019

(30) Foreign Application Priority Data
Mar. 2, 2016 (JP) .............................. JP2016-040225

(51) Int. Cl.
*B32B 7/023* (2019.01)
*B32B 17/06* (2006.01)
(Continued)

(52) U.S. Cl.
CPC ................ *B32B 7/023* (2019.01); *B32B 7/02* (2013.01); *B32B 9/041* (2013.01); *B32B 17/06* (2013.01);
(Continued)

(58) Field of Classification Search
CPC .............. B32B 7/00–7/14; B32B 17/06; G02F 1/00–1/397; C03C 3/04; C03C 3/06;
(Continued)

(56) References Cited

U.S. PATENT DOCUMENTS 5,352,504 A   10/1994   Boulanger et al.
8,445,394 B2 *  5/2013  Aitken .................... C03C 3/091
                                                          501/66
(Continued)

FOREIGN PATENT DOCUMENTS

JP     4-267227 A     9/1992
JP    11-310431 A    11/1999
(Continued)

OTHER PUBLICATIONS

Machine translation of JP2005-019205. Retrieved Jan. 31, 2020.*
(Continued)

*Primary Examiner* — Prashant J Khatri
(74) *Attorney, Agent, or Firm* — Oblon, McClelland, Maier & Neustadt, L.L.P.

(57) ABSTRACT

A laminated substrate for an electrochromic dimmer element includes
a glass substrate; and
a transparent conductive film.
The glass substrate includes a silicon oxide, an aluminum oxide, a boron oxide, an alkaline earth metal oxide, and an
(Continued)

alkali metal oxide in a total amount of 90 mol % or more, and includes the alkali metal oxide in a total amount of 12 mol % or less.

The transparent conductive film includes an indium oxide film containing tin, and a tin oxide film containing at least one of tantalum, antimony and fluorine, in this order from a glass substrate side.

The indium oxide film is formed directly on the glass substrate, a refractive index and an extinction coefficient of the indium oxide film at a wavelength of 1.3 μm is less than 0.4, and greater than 0.4, respectively.

A film thickness of the tin oxide film is greater than 35 nm.

12 Claims, 2 Drawing Sheets

(51) Int. Cl.
| | | |
|---|---|---|
| | *G02F 1/155* | (2006.01) |
| | *B32B 7/02* | (2019.01) |
| | *H01B 5/14* | (2006.01) |
| | *B32B 9/04* | (2006.01) |
| | *G02F 1/15* | (2019.01) |
| | *G02F 1/1343* | (2006.01) |

(52) U.S. Cl.
CPC ............... *G02F 1/155* (2013.01); *H01B 5/14* (2013.01); *B32B 2307/412* (2013.01); *B32B 2307/42* (2013.01); *G02F 1/13439* (2013.01); *G02F 2001/1502* (2013.01)

(58) Field of Classification Search
CPC ..... C03C 3/076–3/118; C03C 17/3671; C03C 17/3681
See application file for complete search history.

(56) References Cited

U.S. PATENT DOCUMENTS

| | | |
|---|---|---|
| 2008/0069490 A1 | 3/2008 | Abe et al. |
| 2011/0043887 A1* | 2/2011 | Valentin ............. B32B 17/1077 359/275 |
| 2011/0216389 A1* | 9/2011 | Piroux ................ G02F 1/15165 359/268 |
| 2012/0212794 A1* | 8/2012 | Giron ................ B32B 17/10174 359/275 |
| 2017/0192332 A1* | 7/2017 | Roudebush ............. B32B 9/005 |
| 2017/0306470 A1* | 10/2017 | Stubbs ................ C03C 17/2453 |

FOREIGN PATENT DOCUMENTS

| | | |
|---|---|---|
| JP | 2005-19205 A | 1/2005 |
| JP | 2013-84555 A | 5/2013 |
| WO | WO 2006/004139 A1 | 1/2006 |

OTHER PUBLICATIONS

Kawashima et al. "New transparent conductive films: FTO coated ITO", Thin Solid Films, 445, (2003); pp. 241-244.*
Weidner et al. "Comparative study of sputter-deposited SnO2 films doped with antimony or tantalum", Phys. Status Solidi B, 253, No. 5, (2016); pp. 923-928.*
International Search Report dated Apr. 18, 2017 in PCT/JP2017/004429 filed Feb. 7, 2017.

* cited by examiner

LAMINATED SUBSTRATE FOR ELECTROCHROMIC DIMMER ELEMENT AND MANUFACTURING METHOD FOR ELECTROCHROMIC DIMMER ELEMENT

BACKGROUND OF THE INVENTION

1. Field of the Invention

The disclosure herein generally relates to a laminated substrate for an electrochromic dimmer element and a manufacturing method for an electrochromic dimmer element.

2. Description of the Related Art

Electrochromic dimmer elements (in the following, simply referred to also as "dimmer elements") include electrochromic layers, in which a colored state and a transparent state switch to each other according to an application of an electric power; and transparent conductive films that apply an electric power to the electrochromic layers. The transparent conductive layers are formed on glass substrates.

Both sizes of the dimmer elements and switching speeds of the dimmer elements have been required to be increased. Thus, high transparency and a low resistance have been required for the transparent conductive films. Because, when the dimmer elements are manufactured, the transparent conductive films are heated to temperature of 350° C. or higher, the transparent conductive films are desired to be highly transparent and have low resistance also after the heating.

For the transparent conductive films for dimmer elements, ZnO-based films, in which Ga, Al or the like is doped, $In_2O_3$-based films, in which Sn is doped (ITO films), or $SnO_2$-based films, in which F, Sb, Ta or the like is doped are generally used.

Although the $SnO_2$-based films are excellent in heat-resistance, in order to decrease an electric resistance, films are required to be thick. However, when the film thickness is increased, a transparency is degraded.

In contrast, the ITO films are excellent in an electric conductivity, and can be made to have a low electric resistance without degrading a transparency. However, the ITO films are poor in heat-resistance, and the electric resistance increases by heating to temperature of 350° C. or higher. The reason is that by baking under an existence of oxygen, oxygen holes along with their electric characteristics are coupled to oxygen atoms and the holes disappear.

In Patent Document 1, a transparent conductive film having a base layer, a conductive layer, and an oxidation-resistant protection layer for a photovoltaic cell element is proposed. For the conductive layer, an ITO film is used. In order to control an increase in an electric resistance by the heating of the ITO film, an oxide, which has an oxide formation energy lower than the ITO film, and has a deficiency of oxygen compared with the chemical equivalent, is used for the base layer. Specifically, $SiO_X$ ($1.2<X<1.8$) is used. When the transparent conductive film is heated, $SiO_X$ absorbs oxygen, and thereby oxidation of the ITO film is controlled.

CITATION LIST

Patent Literature

[PTL 1] WO 2012/157524

SUMMARY OF THE INVENTION

Technical Problem

In Patent Document 1, $SiO_X$ in the base layer has a smaller oxide formation energy than the ITO, and has a greater affinity for oxygen. Thus, due to a small fluctuation in a partial pressure of oxygen in a film formation, the value of X in $SiO_X$ greatly changes. The change in the value of X greatly affects a characteristic of the ITO film after heating, and makes it difficult to prepare a transparent conductive film with a stable quality.

The present invention was made in view of such a problem, and it is an object of the present invention to provide a laminated substrate for an electrochromic dimmer element having an electric conductivity that is stable and excellent after heating to temperature of 350° C. or higher.

Solution to Problem

In order to solve the problem, according to an aspect of the present invention, a laminated substrate for an electrochromic dimmer element including a glass substrate and a transparent conductive film, the glass substrate including a silicon oxide, an aluminum oxide, a boron oxide, an alkaline earth metal oxide, and an alkali metal oxide in a total amount of 90 mol % or more, and including the alkali metal oxide in a total amount of 12 mol % or less, the transparent conductive film including an indium oxide film containing tin, and a tin oxide film containing at least one of tantalum, antimony and fluorine, in this order from a glass substrate side, the indium oxide film being formed directly on the glass substrate, a refractive index of the indium oxide film at a wavelength of 1.3 μm being less than 0.4, and an extinction coefficient of the indium oxide film at a wavelength of 1.3 μm being greater than 0.4, and a film thickness of the tin oxide film being greater than 35 nm, is provided.

Advantageous Effect of Invention

According to the present invention, a laminated substrate for an electrochromic dimmer element, in which a base layer for an ITO film is unnecessary, and an electric conductivity after heating to temperature of 350° C. or higher is stable and excellent, is provided.

DETAILED DESCRIPTION OF THE PREFERRED EMBODIMENTS

In the following, with reference to drawings, embodiments of the present invention will be described. In each drawing, to the same or corresponding component, the same or corresponding numeral is assigned, and redundant explanation will be omitted.

Figure 1:
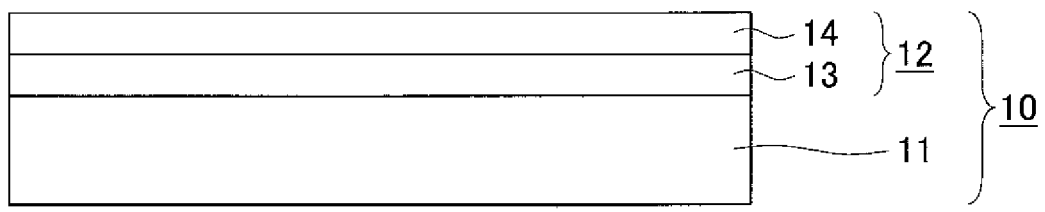
FIG. 1 is a diagram depicting an example of a laminated substrate for an electrochromic dimmer element according to an embodiment.

FIG. 1 is a diagram depicting an example of a laminated substrate for an electrochromic dimmer element according to an embodiment. The laminated substrate 10 includes a glass substrate 11 and a transparent conductive film 12.

The glass substrate 11 contains a silicon oxide ($SiO_2$), an aluminum oxide ($Al_2O_3$), a boron oxide ($B_2O_3$), an alkaline earth metal oxide, and an alkali metal oxide in a total amount of 90 mol % or more, and contains the alkali metal oxide in a total amount of 12 mol % or less. The alkaline earth metal oxide preferably includes at least one selected from a magnesium oxide (MgO), a calcium oxide (CaO), a strontium oxide (SrO), a barium oxide (BaO), and a zinc oxide (ZnO). The alkali metal oxide preferably includes at least one selected from a sodium oxide ($Na_2O$), a potassium oxide ($K_2O$), and a lithium oxide ($Li_2O$).

When the total contained amount of the alkali metal oxide is 12 mol % or less, degrading of a performance of the dimmer element due to movements of alkali metal ions can be controlled. The total contained amount of the alkali metal oxide is preferably 8 mol % or less, more preferably 3 mol % or less, and further preferably 1 mol % or less. The total contained amount of the alkali metal oxide is preferably 0.02 mol % or more, more preferably 0.05 mol % or more, further preferably 0.1 mol % or more, and especially preferably 0.2 mol % or more.

For example, the glass substrate 11 contains $SiO_2$ in an amount of 50-100 mol %, $Al_2O_3$ in an amount of 0-30 mol %, $B_2O_3$ in an amount of 0-30 mol %, the alkaline earth metal oxide in an amount of 0-40 mol % in total, and the alkali metal oxide in an amount of 0 to 12 mol % in total. The total contained amount of the above constituents is 90 mol % or more.

A contained amount of $SiO_2$ is preferably 55 mol % or more, more preferably 60 mol % or more, and further preferably 65 mol % or more. The contained amount of $SiO_2$ is preferably 90 mol % or less, more preferably 85 mol % or less, and further preferably 80 mol % or less.

A contained amount of $Al_2O_3$ is preferably 2 mol % or more, more preferably 5 mol % or more, and further preferably 10 mol % or more. The contained amount of $Al_2O_3$ is preferably 25 mol % or less, more preferably 20 mol % or less, and further preferably 15 mol % or less.

A contained amount of $B_2O_3$ is preferably 1 mol % or more, more preferably 2 mol % or more, and further preferably 3 mol % or more. The contained amount of $B_2O_3$ is preferably 25 mol % or less, more preferably 20 mol % or less, and further preferably 15 mol % or less.

A total contained amount of the alkaline earth metal oxide is preferably 1 mol % or more, more preferably 2 mol % or more, and further preferably 3 mole % or more. The total contained amount of the alkaline earth metal oxide is preferably 35 mol % or less, more preferably 25 mol % or less, and further preferably 20 mol % or less.

A contained amount of the magnesium oxide (MgO) is preferably 1 mol % or more, more preferably 2 mol % or more, and further preferably 3 mol % or more. The contained amount of the magnesium oxide (MgO) is preferably 35 mol % or less, more preferably 25 mol % or less, and further preferably 20 mol % or less.

A contained amount of the calcium oxide (CaO) is preferably 1 mol % or more, more preferably 2 mol % or more, and further preferably 3 mol % or more. The contained amount of the calcium oxide (CaO) is preferably 35 mol % or less, more preferably 25 mol % or less, and further preferably 20 mol % or less.

A contained amount of the strontium oxide (SrO) is preferably 1 mol % or more, more preferably 2 mol % or more, and further preferably 3 mol % or more. The contained amount of the strontium oxide (SrO) is preferably 35 mol % or less, more preferably 25 mol % or less, and further preferably 20 mol % or less.

A contained amount of the barium oxide (BaO) is preferably 1 mol % or more, more preferably 2 mol % or more, and further preferably 3 mol % or more. The contained amount of the barium oxide (BaO) is preferably 35 mol % or less, more preferably 25 mol % or less, and further preferably 20 mol % or less.

A contained amount of the zinc oxide (ZnO) is preferably 1 mol % or more, more preferably 2 mol % or more, and further preferably 3 mol % or more. The contained amount of the zinc oxide (ZnO) is preferably 35 mol % or less, more preferably 25 mol % or less, and further preferably 20 mol % or less.

A contained amount of the sodium oxide ($Na_2O$) is preferably 8 mol % or less, more preferably 3 mol % or less, and further preferably 1 mol % or less. The contained amount of the sodium oxide ($Na_2O$) is preferably 0.02 mol % or more, more preferably 0.05 mol % or more, further preferably 0.1 mol % or more, and especially preferably 0.2 mol % or more.

A contained amount of the potassium oxide ($K_2O$) is preferably 8 mol % or less, more preferably 3 mol % or less, and further preferably 1 mol % or less. The contained amount of the potassium oxide ($K_2O$) is preferably 0.02 mol % or more, more preferably 0.05 mol % or more, further preferably 0.1 mol % or more, and especially preferably 0.2 mol % or more.

A contained amount of the lithium oxide ($Li_2O$) is preferably 8 mol % or less, more preferably 3 mol % or less, and further preferably 1 mol % or less. The contained amount of the lithium oxide ($Li_2O$) is preferably 0.02 mol % or more, more preferably 0.05 mol % or more, further preferably 0.1 mol % or more, and especially preferably 0.2 mol % or more.

The transparent conductive film 12 is formed on the glass substrate 11. The transparent conductive film 12 applies an electric power to an electrochromic layer. In the electrochromic layer, a colored state and a transparent state switch to each other according to the application of the electric power, which will be described later in detail.

The transparent conductive film 12 includes an indium oxide film 13 containing tin (in the following, also referred to as an "ITO film 13"), and a tin oxide film 14 containing at least one of tantalum, antimony and fluorine, in this order from a glass substrate 11 side.

The transparent conductive film 12 is required to have a low sheet resistance (in unit of Ω). The sheet resistance is calculated by dividing a volume resistivity (in unit of Ω·m) by a film thickness. As the volume resistivity decreases, the sheet resistance decreases. As the film thickness increases, the sheet resistance decreases.

The volume resistivity is determined by a type of material. Thus, in the case where a material is the same, as the film thickness increases, the sheet resistance decreases. However, as the film thickness increases, the transparency decreases. For securing a sufficient transparency, the film thickness of the transparent conductive film 12 is preferably 300 nm or less. Similarly, a film thickness of the ITO film 13 is preferably 170 nm or less.

The ITO film 13 is formed directly on the glass substrate 11. A base film is not present between the ITO film 13 and the glass substrate 11. A refractive index n of the ITO film 13 at a wavelength of 1.3 μm (in the following, simply referred to as a "refractive index n") is less than 0.4, and an extinction coefficient k at a wavelength of 1.3 μm (in the following, simply referred to as an "extinction coefficient n") is greater than 0.4. The refractive index n is preferably greater than 0.1. The extinction coefficient k is preferably less than 0.9.

The refractive index n and the extinction coefficient k depend on a partial pressure of oxygen in a formation of the ITO film 13. In order to make the refractive index n less than 0.4 and the extinction coefficient k greater than 0.4, the partial pressure of oxygen in the film formation is required to be lower than the partial pressure for obtaining the minimum of the volume resistivity of the ITO. The partial pressure of oxygen is controlled, for example, by changing a flow ratio of an oxygen gas to an argon gas.

When the refractive index n is less than 0.4 and the extinction coefficient k is greater than 0.4, which will be described in detail later in a section of a practical example, an ITO film 13 that is excellent in an electric conductivity is obtained, also after the heating to temperature of 350° C. or higher in the post processing. The reason is assumed as follows:

The electric conductivity of the ITO film generally depends on a carrier concentration or a crystalline nature. Carriers include oxygen holes or dopants. As the carrier concentration increases, the electric conductivity increases. Moreover, as the crystalline nature is enhanced, the electric conductivity increases. When the film is heated to temperature of 350° C. or higher, a number of the oxygen holes decreases and the crystalline nature increases.

In the case where the refractive index n is less than 0.4 and the extinction coefficient k is greater than 0.4, when the film is heated to temperature of 350° C. or higher in the post processing, the decrease in the electric conductivity due to the decrease of oxygen holes can be sufficiently reduced by an increase in the electric conductivity due to the enhancement of the crystalline nature. Thus, the ITO film 13 with an excellent electric conductivity can be obtained also after the heating.

The ITO has an oxide formation energy that is greater than that of $SiO_X$, described in Patent document 1, and has a low oxygen affinity. Thus, by a small fluctuation in the partial pressure of oxygen in the film formation, the refractive index n and the extinction coefficient k are not appreciably unchanged, and a stable quality of the film can be obtained.

A contained amount of tin oxide in the ITO film 13 falls within a range of 1 to 20 mass %, and preferably 3 to 15 mass %.

The method of formation of the ITO film 13 is not particularly limited, but is preferably a sputtering method.

The tin oxide film 14 protects the ITO film 13 from a side opposite to the glass substrate 11, and controls the oxidation of the ITO film 13. The tin oxide is not appreciably degraded by the heating to the temperature of 350° C. or higher. Moreover, the tin oxide has approximately the same oxide formation energy, and approximately the same oxygen affinity as the ITO. Thus, when the film is heated, a mutual transfer of oxygen between the tin oxide and the ITO is not appreciably generated, and electrical characteristics and optical characteristics of the ITO are not appreciably affected by the tin oxide.

In the case where a film thickness of the tin oxide film 14 is greater than 35 nm, control against the decrease in the electric conductivity, due to the decrease in oxygen holes in the ITO film 13 when the film is heated, is enabled by the counterbalancing increase in the electric conductivity due to the enhancement of the crystalline nature of the ITO film 13. The ITO film 13 with the excellent electric conductivity also after the heating can be obtained. On the other hand, in the case where the film thickness of the tin oxide film 14 is 150 nm or less, a transparent conductive film 12 excellent in transparency can be obtained.

The tin oxide film 14 includes, as a dopant, at least one of antimony, tantalum, and fluorine. For the dopant, from the aspects of the electric conductivity and the transparency, tantalum is preferable. The contained amount of the tantalum oxide preferably falls within a range of 0.75 to 14 mass %, and more preferably 1 to 9 mass %.

The method of formation of the tin oxide film 14 is not particularly limited, but includes a deposition method, a CVD method, a sputtering method, and the like.

Figure 2:
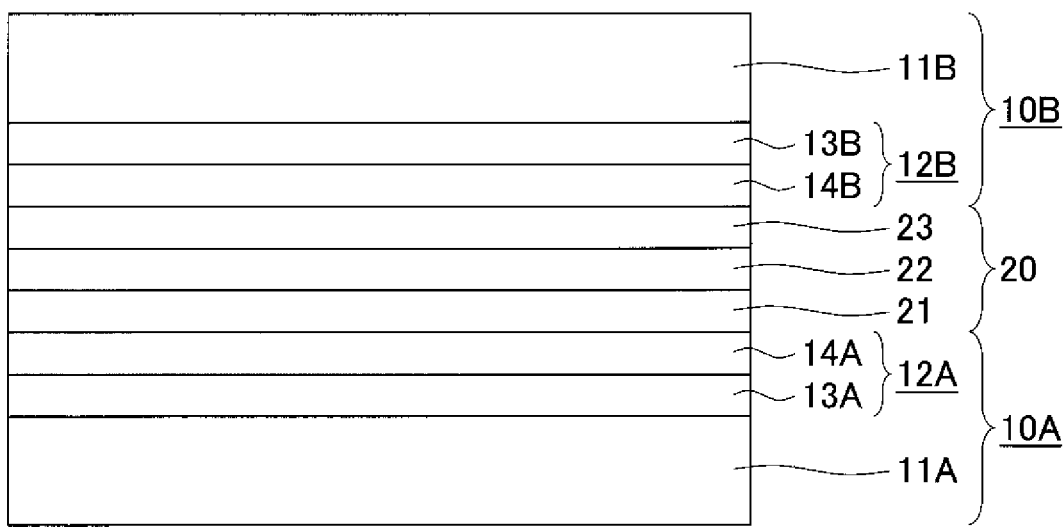
FIG. 2 is a diagram depicting an example of the electrochromic dimmer element according to the embodiment.

FIG. 2 is a diagram depicting an example of an electrochromic dimmer element according to the embodiment. As illustrated in FIG. 2, the dimmer element includes a first laminated substrate 10A, an electrochromic layer 20, and a second laminated substrate 10B. The first laminated substrate 10A and the second laminated substrate 10B are arranged interposing the electrochromic layer 20 therebetween, and apply an electric voltage to the electrochromic layer 20. In the electrochromic layer 20, a colored state and a transparent state switch to each other according to the application of the electric voltage.

The first laminated substrate 10A includes a first glass substrate 11A and a first transparent conductive film 12A. The first transparent conductive film 12A includes an ITO film 13A and a tin oxide film 14A in this order from a first glass substrate 11A side. The first transparent conductive film 12A contacts the electrochromic layer 20 (particularly, an oxidation coloring layer 21, which will be described later). For the first laminated substrate 10A, the laminated substrate 10, illustrated in FIG. 1 may be used, for example.

Similarly, the second laminated substrate 10B includes a second glass substrate 11B and a second transparent conductive film 12B. The second transparent conductive film 12B includes an ITO film 13B and a tin oxide film 14B in this order from a second glass substrate 11B side. The second transparent conductive film 12B contacts the electrochromic layer 20 (particularly, a reduction coloring layer 23, which will be described later). For the second laminated substrate 10B, the laminated substrate 10, illustrated in FIG. 1 may be used, for example.

The electrochromic layer 20 includes an oxidation coloring layer 21, an electrolyte layer 22, and a reduction coloring layer 23, in this order. The oxidation coloring layer 21 and the reduction coloring layer 23 are arranged interposing the electrolyte layer 22 therebetween.

The oxidation coloring layer 21 is formed of a material that is colored according to an oxidation reaction (e.g. an iridium oxide or a nickel oxide). The reduction coloring layer 23 is formed of a material that is colored according to a reduction reaction (e.g. tungsten oxide). The electrolyte layer 22 is formed of a material that is provided with an insulation property for electrons and ion conductivity (e.g. tantalum oxide or a polymer). The electrolyte layer 22 includes a small amount of a material that generates positive ions according to an application of an electric voltage (e.g. water or a supporting electrolysis salt).

When the dimmer element is connected to an external power supply and a forward voltage is applied to the electrochromic layer 20, an electric potential of the first transparent conductive film 12A becomes higher than an electric potential of the second transparent conductive film 12B. As a result, positive ions (e.g. hydrogen ions or lithium ions) are generated in the electrolyte layer 22, and move to the reduction coloring layer 23. At the same time, electrons move from the oxidation coloring layer 21 to the reduction coloring layer 23 via the external power supply. Thus, the reduction coloring layer 23 develops color by the reduction reaction, and the oxidation coloring layer 21 develops color by the oxidation reaction, and thereby the electrochromic layer 20 becomes in a coloring state.

In the case where the application of the electric voltage to the electrochromic layer 20 in the coloring state is stopped, because electrons cannot go through the electrolyte layer 22, the state of the electrochromic layer 20 is maintained in the coloring state.

In contrast, when the dimmer element is connected to the external power supply and a backward voltage is applied to the electrochromic layer 20, the electric potential of the first transparent conductive film 12A becomes lower than the electric potential of the second transparent conductive film 12B. As a result, positive ions move from the reduction coloring layer 23 to the electrolyte layer 22. At the same time, electrons move from the reduction coloring layer 23 to the oxidation coloring layer 21 via the external power supply. Thus, the coloring of the oxidation coloring layer 21 and the coloring of the reduction coloring layer 23 are stopped, and thereby the electrochromic layer becomes in the transparent state.

Incidentally, when dimmer elements are manufactured, which will be described in detail later, the first laminated substrate 10A or the second laminated substrate 10B are heated to temperature of 350° C. or higher. According to the embodiment, because the laminated substrate 10, illustrated in FIG. 1, may be used for the first laminated substrate 10A or the second laminated substrate 10B, the decrease in the electric conductivity can be controlled, also after the heating. Thus, both the sizes of the dimmer elements and the switching speeds of the dimmer elements can be increased.

Figure 3:
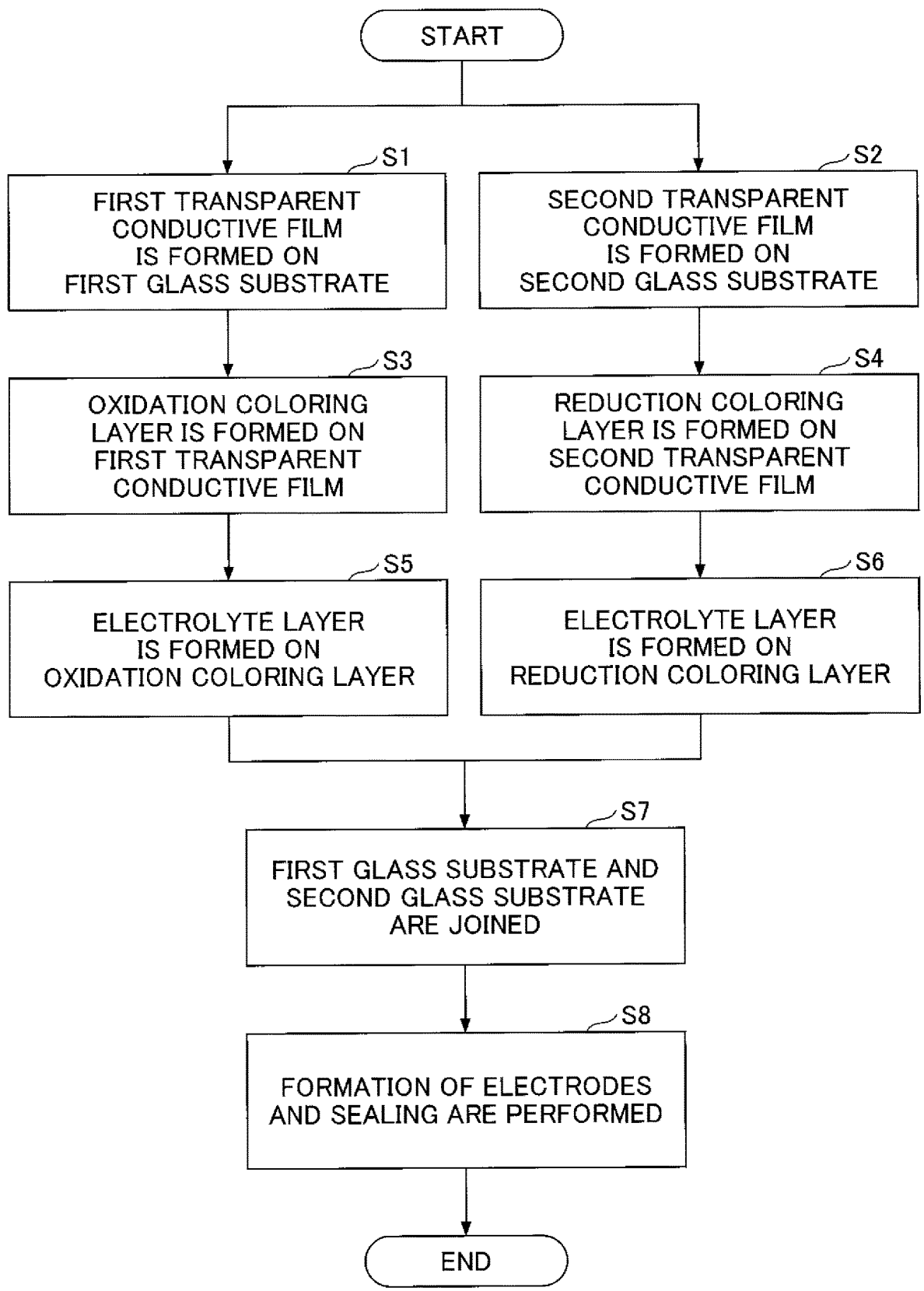
FIG. 3 is a flowchart depicting a manufacturing method for the electrochromic dimmer element according to the embodiment.

FIG. 3 is a flowchart depicting a manufacturing method for the electrochromic dimmer element according to the embodiment. First, a first glass substrate and a second glass substrate are provided. Then, a first transparent conductive film is formed on the first glass substrate (step S1), an oxidation coloring layer is formed on the first transparent conductive film (step S3), and an electrolyte layer is formed on the oxidation coloring layer (step S5). Moreover, a second transparent conductive layer is formed on the second glass substrate (step S2), a reduction coloring layer is formed on the second transparent conductive film (step S4), and an electrolyte layer is formed on the reduction coloring layer (step S6). The first transparent conductive layer may be different from the second transparent conductive layer; however, for the transparent conductive films according to the embodiment, which will be heated to temperature of 350° C. or higher in the post processing, an indium oxide film in which a refractive index at a wavelength of 1.3 μm is less than 0.4, and an extinction coefficient at a wavelength of 1.3 μm is greater than 0.4, is arranged. To the formation method for the first transparent conductive film and the second transparent conductive film, a publicly-known method, such as a sputtering method, can be applied. The formation method for the oxidation coloring layer and the reduction coloring layer includes a sputtering method, a deposition method, a wet method, or the like. In the embodiment, in a process of forming at least any one of the oxidation coloring layer and the reduction coloring layer, a heating process to temperature of 350° C. or higher is performed. Note that in the embodiment, the electrolyte layer is formed both above the oxidation coloring layer and above the reduction coloring layer. However, the electrolyte layer may be arranged only above either one of the layers. After forming the electrolyte layer, the first glass substrate and the second glass substrate are joined, interposing the electrolyte layer, the oxidation coloring layer and the reduction coloring layer therebetween (step S8). Afterwards, electrode layers are formed, a sealing is performed (step S9), and thereby the electrochromic dimmer element is manufactured.

EXAMPLES

The Examples 1 to 5 are practical examples, and the Examples 5 to 11 are comparative examples. In the Examples 1 to 11, either one of a glass "A" and a glass "B" was used as a glass of the glass substrates. Contained amounts of respective components of the glass "A" were 66 mol % of a silicon oxide ($SiO_2$), 11 mol % of an aluminum oxide ($Al_2O_3$), 8 mol % of a boron oxide ($B_2O_3$), 5 mol % of a magnesium oxide (MgO), 5 mol % of a calcium oxide (CaO), and 5 mol % of a strontium oxide (SrO). Contained amounts of respective components of the glass "B" were 71 mol % of a silicon oxide ($SiO_2$), 1 mol % of an aluminum oxide ($Al_2O_3$), 7 mol % of a magnesium oxide (MgO), 8 mol % of a calcium oxide (CaO), and 13 mol % of a sodium oxide ($Na_2O$).

Manufacturing Method for Laminated Substrate in Examples 1-6, and Examples 10-11

An ITO film (transparent conductive film) with a thickness of 150 nm was formed on a glass substrate, which was heated to 300° C., using an ITO target containing 10 wt % of $SnO_2$, by a sputtering method. The film formation was performed with a DC discharge and with an Ar gas and an $O_2$ gas, using an inline-type apparatus provided with a load-lock mechanism. In this film formation, an amount of the $O_2$ gas in the entire gas was set to 0.5 vol %, which was less than 1 vol % for obtaining the lowest resistance. Subsequently, a tin oxide film containing Ta was formed with a film thickness, listed in TABLE 1, using a $SnO_2$ target containing 5 wt % of $Ta_2O_5$.

Manufacturing Method for Laminated Substrate in Examples 7-8

An ITO film with a thickness of 150 nm was formed on a glass substrate, which was heated to 300° C., using an ITO target containing 10 wt % of $SnO_2$, by the sputtering method. The film formation was performed with a DC discharge and with an Ar gas and an $O_2$ gas, using the inline-type apparatus provided with the load-lock mechanism. In this film formation, an amount of the $O_2$ gas in the entire gas was set to 1 vol % for obtaining the lowest resistance. Subsequently, a tin oxide film containing Ta was formed with a film thickness, listed in TABLE 1, using a $SnO_2$ target containing 5 wt % of $Ta_2O_5$.

Manufacturing Method for Laminated Substrate in Example 9

A $SiO_2$ film with a thickness of 30 nm was formed on a glass substrate, which was heated to 300° C., using a $SiO_2$ target by the sputtering method with an RF discharge and with an Ar gas of 100%. Subsequently, a ITO film with a thickness of 150 nm was formed on the $SiO_2$ film, using the same manufacturing method as in the Examples 1-6 and 10-12. Next, a tin oxide film containing Ta was formed with a film thickness, listed in TABLE 1, using a $SnO_2$ target containing 5 wt % of $Ta_2O_5$.

(Film Thickness Measurement)

A film thickness was measured with a stylus type step profiler (DEKTAK 150, manufactured by Veeco Inc.).

(Evaluation of Resistance)

A sheet resistance was measured using a four probe-type resistance meter (Loresta, manufactured by Mitsubishi Petrochemical Co., Ltd.).

(Evaluation of Optical Characteristics)

A transmittance was measured using an absolute reflectance measuring device (JASCOARM-500N, manufactured by JASCO Corporation), and an average transmittance within a wavelength range of 350 nm to 800 nm was obtained.

In order to obtain a refractive index n and an extinction coefficient k, values of two parameters, Psi ($\Psi$) and Delta ($\Delta$), indicating a polarization state of light were measured using a spectral ellipsometry device (M-2000DI, manufactured by J. A. Woollam Co., Inc.). A refractive index n and an extinction coefficient k were obtained by using an analysis software WVASE32 for analyzing using an optical model based on optics, such as the Fresnel coefficient or Snell's law, from the measured values using the ellipsometry device and transmittance data within a wavelength range of 350 nm to 1700 nm.

(Heating Treatment)

Because it is difficult to measure the sheet resistance of the transparent conductive film after laminating the electrochromic layer, in order to evaluate the heat resistance of the transparent conductive film, the sample was heated to a heating temperature listed in TABLE 1 by using an infrared lamp heating device (RTP-6, manufactured by ULVAC, Inc.), and a change in the resistance was observed. The heating atmosphere in the heat resistance evaluation was an air atmosphere.

Thus, the sheet resistance of the transparent conductive film was 13Ω or less also after the heating. Moreover, according to the Examples 1-4, because the film thickness of the TTO film was 150 nm or less, the transmittance of the transparent conductive film was 80% or more before the heating.

In contrast, according to the Example 6, because the film thickness of the TTO film was 35 nm or less, the sheet resistance of the transparent conductive film was large after the heating. Moreover, according to the Example 7, because the ITO film with the refractive index n of greater than 0.4 and the extinction coefficient k of less than 0.4 was formed directly on the glass substrate before the heating, the sheet resistance of the transparent conductive film was large after the heating. According to the Example 8, because the ITO film with the refractive index n of greater than 0.4 was formed directly on the glass substrate before the heating, the sheet resistance of the transparent conductive film was large after the heating. Moreover, according to the Examples 9-11, a glass, in which the contained amount of alkali metal oxide is greater than 12 mol %, was used for the glass substrate, the sheet resistance of the transparent conductive film after the heating was large, due to the influence of a heat shrinkage of the glass substrate with a large thermal expansion coefficient.

As described above, embodiments and the like of a laminated substrate for an electrochromic dimmer element have been described. The present invention is not limited to the embodiments or the like. Various variations and enhancements may be made without departing from the scope of the present invention.

The present application is based on and claims the benefit of priority of Japanese Priority Application No. 2016-040225 filed on Mar. 2, 2016, the entire contents of which are hereby incorporated by reference.

REFERENCE SIGNS LIST 10 laminated substrate
11 glass substrate
12 transparent conductive film
13 indium oxide film
14 tin oxide film
10A first laminated substrate
11A first glass substrate
12A first transparent conductive film
10B second laminated substrate

TABLE 1

| | | before baking | | | | | | after baking | |
|---|---|---|---|---|---|---|---|---|---|
| | | SiO$_2$ film | ITO film | | | TTO film | entire transparent conductive film | | baking | entire transparent conductive film |
| | substrate glass | film thickness (nm) | film thickness (nm) | refractive index n | extinction coefficient k | film thickness (nm) | sheet resistance (Ω) | transmittance (%) | maximum temperature (° C.) | sheet resistance (Ω) |
| ex. 1 | A | — | 150 | 0.364 | 0.5469 | 40 | 9.34 | 81.84 | 400 | 9.56 |
| ex. 2 | A | — | 150 | 0.364 | 0.5469 | 40 | 9.34 | 81.84 | 460 | 12.19 |
| ex. 3 | A | — | 150 | 0.359 | 0.5575 | 100 | 9.16 | 80.12 | 400 | 9.02 |
| ex. 4 | A | — | 150 | 0.359 | 0.5575 | 100 | 9.16 | 80.12 | 460 | 9.97 |
| ex. 5 | A | — | 150 | 0.350 | 0.5742 | 160 | 9.04 | 77.33 | 400 | 8.97 |
| ex. 6 | A | — | 150 | 0.366 | 0.4427 | 25 | 9.74 | 82.67 | 400 | 19.6 |
| ex. 7 | A | — | 150 | 0.469 | 0.3213 | 40 | 9.87 | 82.02 | 400 | 18.1 |
| ex. 8 | A | — | 150 | 0.427 | 0.4239 | 100 | 9.52 | 81.22 | 400 | 15.7 |
| ex. 9 | B | 30 | 150 | 0.392 | 0.4334 | 40 | 10.8 | 80.65 | 400 | 22.5 |
| ex. 10 | B | — | 150 | 0.382 | 0.5116 | 40 | 11 | 79.96 | 400 | 20.6 |
| ex. 11 | B | — | 150 | 0.382 | 0.5116 | 100 | 10.32 | 78.48 | 400 | 16.1 |

As is evident from TABLE 1, according to the Examples 1-5, the ITO film with the refractive index n of less than 0.4 and the extinction coefficient k of greater than 0.4 was formed directly on the glass substrate before the heating, and the film thickness of the TTO film was greater than 35 nm.

11B second glass substrate
12B second transparent conductive film
20 electrochromic layer
21 oxidation coloring layer
22 electrolyte layer
23 reduction coloring layer

What is claimed is:

1. An electrochromic dimmer switch, comprising:
a first glass substrate; and
a first transparent conductive film,
wherein the glass substrate comprises a silicon oxide, an aluminum oxide, a boron oxide, an alkaline earth metal oxide, and an alkali metal oxide in a total amount of 90 mol % or more, and includes the alkali metal oxide in a total amount of 12 mol % or less,
wherein the first transparent conductive film includes an indium oxide film containing tin, and a tin oxide film containing at least one of tantalum, antimony and fluorine, in this order from a glass substrate side,
wherein the indium oxide film is formed directly on the glass substrate, a refractive index of the indium oxide film at a wavelength of 1.3 μm is less than 0.4, and an extinction coefficient of the indium oxide film at a wavelength of 1.3 μm is greater than 0.4, and
wherein a film thickness of the tin oxide film is greater than 35 nm.

2. The electrochromic dimmer switch according to claim 1, wherein the film thickness of the tin oxide film is less than or equal to 150 nm.

3. The electrochromic dimmer switch according to claim 1, further comprising:
an oxidation coloring layer;
an electrolyte layer;
a reduction coloring layer;
a second transparent conductive film; and
a second glass substrate.

4. The electrochromic dimmer switch according to claim 1, wherein the tin oxide film contains antimony.

5. The electrochromic dimmer switch according to claim 1, wherein the tin oxide film contains fluorine.

6. The electrochromic dimmer switch according to claim 1, wherein the tin oxide film contains tantalum.

7. The electrochromic dimmer switch according to claim 3, wherein the film thickness of the tin oxide film is from greater than 35 nm to 150 nm.

8. A manufacturing method for an electrochromic dimmer element, comprising a first glass substrate, a first transparent conductive film, an oxidation coloring layer, an electrolyte layer, a reduction coloring layer, a second transparent conductive film, and a second glass substrate, in this order, the manufacturing method comprising:
heating, to 350° C. or higher, at least one of a first laminated substrate configured of the first glass substrate and the first transparent conductive film, and a second laminated substrate configured of the second glass substrate and the second transparent conductive film,
wherein the laminated substrate according to claim 1 is used as the at least one of the first laminated substrate and the second laminated substrate, that is heated to 350° C. or higher.

9. A laminated substrate, comprising:
a first glass substrate; and
a first transparent conductive film,
wherein the glass substrate comprises a silicon oxide, an aluminum oxide, a boron oxide, an alkaline earth metal oxide, and an alkali metal oxide in a total amount of 90 mol % or more, and includes the alkali metal oxide in a total amount of 12 mol % or less,
wherein the first transparent conductive film includes an indium oxide film containing tin, and a tin oxide film containing at least one of tantalum and fluorine, in this order from a glass substrate side,
wherein the indium oxide film is formed directly on the glass substrate, a refractive index of the indium oxide film at a wavelength of 1.3 μm is less than 0.4, and an extinction coefficient of the indium oxide film at a wavelength of 1.3 μm is greater than 0.4, and
wherein a film thickness of the tin oxide film is greater than 35 nm.

10. The laminated substrate according to claim 9, wherein the film thickness of the tin oxide film is from greater than 35 nm to 150 nm.

11. The laminated substrate according to claim 9, wherein the tin oxide film contains fluorine.

12. The laminated substrate according to claim 9, wherein the tin oxide film contains tantalum.

* * * * *